(12) United States Patent
Kurungot et al.

(10) Patent No.: US 10,170,770 B2
(45) Date of Patent: Jan. 1, 2019

(54) N-DOPED POROUS CARBON ELECTROCATALYST AND PROCESS FOR PREPARATION THEREOF

(71) Applicant: COUNCIL OF SCIENTIFIC & INDUSTRIAL RESEARCH, Rafi Marg, New Delhi (IN)

(72) Inventors: Sreekumar Kurungot, Pune (IN); Rahul Banerjee, Pune (IN); Sekar Pandiaraj, Pune (IN); Harshitha Barike Aiyappa, Pune (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 236 days.

(21) Appl. No.: 15/022,767

(22) PCT Filed: Sep. 19, 2014

(86) PCT No.: PCT/IN2014/000612
§ 371 (c)(1),
(2) Date: Mar. 17, 2016

(87) PCT Pub. No.: WO2015/040638
PCT Pub. Date: Mar. 26, 2015

(65) Prior Publication Data
US 2016/0211529 A1    Jul. 21, 2016

(30) Foreign Application Priority Data
Sep. 19, 2013   (IN) .......................... 2757/DEL/2013

(51) Int. Cl.
*H01M 4/90*    (2006.01)
*H01M 4/86*    (2006.01)
(Continued)

(52) U.S. Cl.
CPC ............... *H01M 4/90* (2013.01); *H01M 4/86* (2013.01); *H01M 4/8605* (2013.01); *H01M 4/88* (2013.01); *H01M 4/96* (2013.01)

(58) Field of Classification Search
None
See application file for complete search history.

(56) References Cited

U.S. PATENT DOCUMENTS

2006/0263288 A1   11/2006   Pak et al.
2010/0167106 A1   7/2010    Pak et al.
(Continued)

FOREIGN PATENT DOCUMENTS

WO    WO 2013/040567    3/2013

OTHER PUBLICATIONS

Shubin Yang et al.: "Graphene-Based Carbon Nitride Nanosheets as Efficient Metal-Free Electrgcatalysts for Oxygen Reduction Reactions", Angewandte Chemie International Edition, vol. 50, No. 23, May 27, 2011 (May 27, 2011), pp. 5339-5343, XP002734404, DO 1: 10.1002/anie.201100170 see, in particular p. 5341, left col. lines 29-36; figure 3 and figures 4-5.

(Continued)

*Primary Examiner* — Guinever S Gregorio
(74) *Attorney, Agent, or Firm* — Workman Nydegger (57) ABSTRACT

The present invention relates to an efficient, non-metal, N-doped porous carbon electrocatalyst for oxygen reduction reaction and a process for the preparation of using $g\text{-}C_3N_4$ as a nitrogen precursor, metal organic frameworks (MOF) as a carbon template having high specific surface area, large number of active sites and large pore volume.

9 Claims, 7 Drawing Sheets

(51) Int. Cl.
H01M 4/88 (2006.01)
H01M 4/96 (2006.01)

(56) References Cited

U.S. PATENT DOCUMENTS

2012/0077667 A1* 3/2012 Liu .................... H01M 4/8605
502/101
2015/0318557 A1* 11/2015 Serov ................... B01J 37/08
429/532

OTHER PUBLICATIONS

Zhin1n Lei et al.: "Structural Evolution and Electrocatalytic Application of Nitrogen-Doped Carbons Shells Synthesized by Pyrolysis of Near Monodisperse Polyanyline Nanospheres", Journal of Materials Chemistry, vol. 19, Jun. 30, 2009 (Jun. 30, 2009), pp. 5985-5995, XPOO2734405, DOI: 10.1039/b9O8223a see, in particular table 1 sample 1-11 NCS-1.5-650 (8.7%wt. N).
Stephanie L. Candelaria et al.: "Nitrogen Modification of Highly Porous Carbon for Improved Supercapacitor Performance", J. Mater. Chem., vol. 22, Apr. 26, 2012 (Apr. 26, 2012), pp. 9884-9889, XP002734454, DOI: 10.1039/C2JM30923H see, in particular p. 9885, "Synthesis", lines 1-40; see in particular also figures 3 -5 of D4 and tables 1, 2.
Hai-Long Jian et al.: "From Metal-Organic Framework to Nan0p0r0us Carbon: Toward a Very High Surface Area and Hydrogen Uptake", Journal of the American Chemical Society, vol. 133, Jul. 13, 2011 (Jul. 13, 2011), pp. 11854-11857, XP002734430, DOI: 10.1021/ja203184k see, in particular p. 11854, right column, lines 14-27.
Khaled Parvez et al.: Graphene and Its Iron-Based Composite as Efficient Electrocatalyst for Oxygen Reduction Reaction. ACS Nano, vol. 6, No. 11, Oct. 10, 2012 (Oct. 10, 2012), pp. 9541-9550, XP0O2734407, DOI: 10.1021/nn302674k see, in particular p. 9542, right column, lines 19-p. 9543, left column, 1ine 1 and figure 3(a).
Wei Xia et al: Hierarchically Porous Carbons From Metal Organic Gels and Their Application in Energy Storage, Scientific Reports, vol. 3, 1935, Jun. 3, 2013 (Jun. 3, 2013), pp. 1-8, XPOO2734409, DOI: 10.1038/srep01935 the whole document.
PCT/IN2014/000612, Feb. 4, 2015, International Search Report and Written Opinion.
PCT/IN2014/000612, Jan. 11, 2016, International Preliminary Report on Patentability.

* cited by examiner

N-DOPED POROUS CARBON ELECTROCATALYST AND PROCESS FOR PREPARATION THEREOF

FIELD OF THE INVENTION

The present invention relates to an N-doped porous carbon electrocatalyst for oxygen reduction reaction. Particularly, the present invention relates to process for the preparation of N-doped porous carbon electrocatalyst using $g-C_3N_4$ as a nitrogen precursor, metal organic frameworks (MOF) as a carbon template having high specific surface area, large number of active sites and large pore volume for faster mass transport.

BACKGROUND AND PRIOR ART OF THE INVENTION

There are number of electrocatalysts for fuel cells are known in the art, such as Platinum and other precious metals based electrocatalysts have proven to be effective in catalyzing the rate of ORR (Oxygen reduction reaction) in Polymer electrolyte membrane fuel cells (PEMFC). However on account of their high cost, scarcity, and less durability in the electrochemical environment, their commercialization is affected. Although Pt and transition metal alloy based electrocatalysts are best known ORR catalysts (in PEMFC), the major lapse lies in the metal corrosion as well as electrochemical stability associated with them. Henceforth finding an alternate so as to dramatically enhance the ORR, along with reducing the higher cost apart from rendering electrochemical stability than conventional catalyst is the need of the hour. In that direction increasing the mass transfer and creating more active sites are the two ways to improve the kinetics of the ORR.

The research on developing metal-free electrocatalysts for oxygen reduction reaction (ORR) has gained substantial attention for economic purpose, where graphene-based carbon nitride nanosheets as efficient metal-free electrocatalysts for oxygen reduction reactions is reported in Angewandte Chemie International Edition 50, (23), pp 5339-5343, 0.2011 by Dr. Shubin Yang. Further the semiconducting properties and emerging applications of polymeric carbon nitrides in photocatalysis and photoelectrochemical energy conversion is reported by Zhang et al. in Science of Advanced Materials, 4, (2), 2012, pp. 282-291. Also preparation of graphitic carbon nitride $(g-C_3N_4)/WO_3$ composites is reported by Katsumata K et al. in J Hazard Mater. 2013; 260: 475-82.

The doping is found to alter the electron density of carbon, thereby, generating more active sites, needed for ORR. In recent times metal free N-doped carbon materials are getting more attention due to their potential in enhancing the kinetics of the ORR, high electrochemical stability, CO tolerance and cost effective. Thus these materials can act as efficient substitutes for Pt to reduce the cost, and thus promote the commercialization of fuel cell technology.

Template based carbon synthesis has recently gained momentum wherein, a suitable carbon precursor viz., chitosan, glucose, etc. along with a nitrogen source is being used for deriving N doped carbons with high surface area, and good mechanical stability. However, the template removal often involves harsh acid treatment thereby causing undesirable changes in the carbon properties during post-treatment.

On account of their self-sacrificial nature, high carbon content and inherent porosity, these coordination polymers have been recently used to derive highly porous carbon structures thereby ruling out the need for any additional carbon sources. They could be directly used for anchoring the incoming hetero atoms. Among the N precursors, by virtue of its high N content, graphitic carbon nitride $(g-C_3N_4)$ has previously proven to be an effective catalyst for many reactions such as photocatalytic hydrogen generation water splitting such as Xinchen Wang et al. disclosed an abundant material, polymeric carbon nitride that can produce hydrogen from water under visible-light irradiation in the presence of a sacrificial donor in Nature Materials 8, 76-80 (2009).

Article titled "Nanoporous Graphitic-C3N4@Carbon Metal-Free electrocatalysts for Highly Efficient Oxygen Reduction" by Y Zheng published in J. Am. Chem. Soc., 2011, 133. (50), pp 20116-20119 reports that a $g-C_3N_4$@carbon metal-free oxygen reduction reaction (ORR) electrocatalyst and synthesized by uniform incorporation of g-C3N4 into a mesoporous carbon to enhance the electron transfer efficiency of $g-C_3N_4$. The resulting g-C3N4@carbon composite exhibited competitive catalytic activity (11.3 mA $cm^{-2}$ kinetic-limiting current density at −0.6 V) and superior methanol tolerance compared to a commercial Pt/C catalyst. Furthermore, it demonstrated significantly higher catalytic efficiency (nearly 100% of four-electron ORR process selectivity) than a Pt/C catalyst. The proposed synthesis route is facile and low-cost, providing a feasible method for the development of highly efficient electrocatalysts.

Article titled "Graphene-Based Carbon Nitride Nanosheets as Efficient Metal-Free Electrocatalysts for Oxygen Reduction Reactions" by S Yang published in Angewandte Chemie International Edition, May 27, 2011, Volume 50, Issue 23, pages 5339-5343 reports Sandwich-like, graphene-based carbon nitride nanosheets (G-CN), among many other advantages, show an enhanced electrical conductivity. Oxygen atoms can thus access the catalyst surface easily and the rapid diffusion of electrons in the electrode during the oxygen reduction process is facilitated. G-CN nanosheets can hence serve as metal-free electrocatalysts for oxygen reduction reactions (ORR) with excellent performance.

Article titled "Nitrogen-Doped Graphene as Efficient Metal-Free Electrocatalyst for Oxygen Reduction in Fuel Cells" by L Qu published in ACS Nano, 2010, 4 (3), pp 1321-1326 reports the synthesis of nitrogen-doped graphene (N-graphene) by chemical vapor deposition of methane in the presence of ammonia. The resultant N-graphene was demonstrated to act as a metal-free electrode with a much better electrocatalytic activity, long-term operation stability, and tolerance to crossover effect than platinum for oxygen reduction via a four-electron pathway in alkaline fuel cells. To the best of our knowledge, this is the first report on the use of graphene and its derivatives as metal-free catalysts for oxygen reduction. The important role of N-doping to oxygen reduction reaction (ORR) can be applied to various carbon materials for the development of other metal-free efficient ORR catalysts for fuel cell applications, even new catalytic materials for applications beyond fuel cells.

Article titled "From metal-organic framework to nanoporous carbon: toward a very high surface area and hydrogen uptake" by H L Jiang published in J Am Chem Soc. 2011 Aug. 10; 133(31):11854-11857 reports a zeolite-type metal-organic framework as both a precursor and a template and furfuryl alcohol as a second precursor, nanoporous carbon material has been prepared with an unexpectedly high surface area (3405 $m^2/g$, BET method) and considerable hydrogen storage capacity (2.77 wt % at 77 K and 1 atm) as well as good electrochemical properties as an electrode material for electric double layer capacitors. The pore structure and surface area of the resultant carbon materials can be tuned simply by changing the calcination temperature.

CN103178273A discloses electrocatalyst of MOFs (Metal-organic Frameworks)/graphene composite carrier and a preparation method of the electrocatalyst. The electrocatalyst is composed of the MOFs/graphene composite carrier and an active component. The preparation method of the MOFs/graphene composite carrier comprises the following steps of: preparing MOFs/graphene composite carrier through a hydrothermal reaction method; and loading the active component on the composite carrier by adopting a microwave synthesis method.

However, the pristine $g-C_3N_4$ material is found to exhibit limited activity due to its low electrical conductivity and minimum surface area. Therefore, one of the ways to overcome this limitation could be the incorporation of $g-C_3N_4$ into a highly mesoporous and conductive carbon backbone thereby creating a much better and closer requisite for ORR.

OBJECTIVE OF INVENTION

An object of the present invention is to provide N-doped porous carbon electrocatalyst comprising carbon in the range of 90 to 93% and nitrogen in the range of 7 to 10%.

The main object of the present invention is to provide an N-doped porous carbon electrocatalyst by doping $g-C_3N_4$ (Graphitic carbon nitride) into highly mesoporous carbon using metal organic frameworks (MOF) as a carbon template and $g-C_3N_4$ as a nitrogen precursor.

Another object of the present invention is to provide process for the preparation of N-doped porous carbon electrocatalyst by doping $g-C_3N_4$ into highly mesoporous carbon using metal organic frameworks (MOF) as a carbon template, which offers large number of ORR active sites along with better pore volume for facile and faster transport of gases and ions to the active sites.

SUMMARY OF THE INVENTION

Accordingly, present invention provides an N-doped porous carbon electrocatalyst comprising carbon in the range of 90 to 93% and nitrogen in the range of 7 to 10%.

In an embodiment, present invention provides a process for the preparation N-doped porous carbon electrocatalyst as claimed in claim 1, comprising the steps of:
a. pyrolysing of metal organic frameworks (MOF) to obtain mesoporous carbon (MOFC);
b. grinding the mesoporous carbon as obtained in step (a) and melamine to get a uniform mixture;
c. dispersing the reaction mixture of step (b) in alcohol in order to get a homogeneous mixture;
d. evaporating solvent by simultaneous heating and stirring the homogeneous mixture as obtained in step (c) till a solid material obtained;
e. heating the solid material as obtained in step (d) in a flow of argon atmosphere to obtain a composite;
f. pyrolysing the composite as obtained in step (e) under argon atmosphere to obtain N-doped porous carbon electrocatalyst.

In another embodiment of the present invention, the MOF is selected from the group consisting of MOF-2, MOF-5 preferably MOF-5. 4.

In yet another embodiment of the present invention, in step (a) pyrolysis is done at temperature in the range of 900 to 1000° C. at a heating rate of 3 to 5° C./min for period in the range of 2 to 3 h.

In still another embodiment of the present invention, in step (c) alcohol is selected from methanol, ethanol, propanol, preferably ethanol.

In yet another embodiment of the present invention, in step (b) the ratio of the mesoporous carbon and melamine ranging between 1:2 to 1:5.

In further another embodiment of the present invention, in step (c) the dispersion is sonicated for period in the range of 20 to 30 min in a bath type sonicator followed by stirring for period in the range of 6 to 12 h at room temperature in the range of 25 to 30° C.

In one another embodiment of the present invention, in step (d) evaporation is performed at temperature in the range of 50 to 60° C.

In further another embodiment of the present invention, in step (e) heating is performed at temperature in the range of 300 to 550° C. and flow of argon at a rate of 3 to 5° C./min for period in the range of 2 to 3 h followed by natural cooling to room temperature in the range of 25 to 30° C.

In still another embodiment of the present invention, in step (f) pyrolysing at a rate of 3 to 5° C./min for period in the range of 2 to 3 h.

In still another embodiment of the present invention, in step (f) heating is carried out at 700-1000° C.

In yet another embodiment of the present invention, the catalyst is selected form MOFCN550, MOFCN800, MOFCN900 and MOFCN1000.

DETAILED DESCRIPTION OF THE INVENTION

Accordingly, the present invention provide an N-doped porous carbon electrocatalyst by doping g-$C_3N_4$ into highly mesoporous carbon using metal organic frameworks (MOF) as a carbon template and g-C3N4 as a nitrogen precursor having excellent oxygen reducing activity.

In an aspect, the present invention provide process for the preparation of N-doped porous carbon electrocatalyst by doping g-$C_3N_4$ into highly mesoporous carbon using metal organic frameworks (MOF) as a carbon template and g-C3N4 as a nitrogen precursor having excellent oxygen reducing activity.

For the purpose of this invention, the expression 'N-doped porous carbonized MOF' or 'graphitic carbon nitride (g-$C_3N_4$) doped porous carbon' or 'graphitic carbon nitride (g-C3N4)-MOF composite' are used interchangeably throughout the specification and the same may be appreciated as such by the person skilled in the art.

The present invention provides N-doped porous carbon electrocatalyst, comprising g-C3N4 as a nitrogen precursor, metal organic frameworks (MOF) as a carbon template.

The present invention provides N-doped porous carbon electrocatalyst comprising N-doped porous carbonized metal-organic frameworks (MOF) having excellent oxygen reducing activity, prepared by pyrolysis of metal organic frameworks (MOF) to obtain porous carbonized MOF followed by doping with melamine and calcinated at different temperatures under inert atmospheres to obtain N-doped porous carbonized MOF.

The present invention provides a process for the preparation N-doped porous carbon electrocatalyst comprising the following steps:
a. Pyrolysis of metal organic frameworks (MOF) to obtain mesoporous carbon;
b. Grinding the mesoporous carbon samples of step (a) and melamine to get a uniform mixture;
c. Disperse the reaction mixture of step (b) in alcohol followed by sonication for 30 min in a bath type sonicator followed by stirring for 12 h at room temperature in order to get a homogeneous mixture;
d. Evaporating solvent by simultaneous heating and stirring at 60° C. till a solid material obtained;
e. Heating the solid material of step (d) in a flow of argon atmosphere at 550° C. at a rate of 5° C./min for 3 h followed by natural cooling to room temperature to obtain N-doped porous carbon electrocatalyst.

The metal organic frameworks (MOF) may be selected from the group consisting of MOF-2, MOF-5, preferably MOF-5.

The present invention attempted to effectively utilize the macro porosity of carbon as a nitrogen reservoir through initial plugging of g-C3N4 units via in situ polymerization of melamine. Moreover, the defects arising from micropores present in the carbon skeleton could be expected to render anchoring sites for the incoming N atoms.

In the present invention, the porous carbon is nanoporous, particularly mesoporous carbon. The mesoporous carbon on MOF carbon template is also referred as the mesoporous carbonized MOF, wherein the mesoporous carbonized MOF is obtained by pyrolysis of MOF-5 at 1000° C. at a heating rate of 5° C./min in Argon atmosphere for 3 h.

The mesoporous carbonized MOF i.e. [MOFC] exhibits high specific surface areas mainly with mesopores and excellent electrochemical properties as electrode materials for supercapacitor. The specific surface area, pore size distribution, and electrical conductivity of the resultant carbon materials are further influenced by the carbonization temperature. The method efficiently makes use of the self-sacrificial template nature of MOFs and thereby results in the in situ pore formation ruling out the need for an additional carbon source and post purification procedures.

The nitrogen doping is accompanied with increase in the defects sites thereby affecting the conductivity of the catalyst as a whole. This approach enables controlled formation of ORR sites and directed nitrogen doping without affecting the parent carbon matrix.

Graphitic carbon nitride (g-$C_3N_4$) was synthesized by direct pyrolysis of melamine. It was found that higher pyrolysis temperature resulted in more perfect crystalline structure of the graphitic carbon nitride product. The graphitic carbon nitride (g-$C_3N_4$) doped mesoporous carbonized MOF is prepared by simple pyrolysis of melamine with [MOFC] under inert atmosphere thereby enriching the nitrogen content to 7.0-8.3% besides maintaining high surface area.

The process comprises grinding porous carbonized MOF-5 [MOFC] and melamine together in suitable mass ratio and dispersed in lower alcohol followed by stirring at room temperature for 12 h. The resulting material is separated by evaporating the solvent and then heated in an Ar flow at 550° C. for 3 h to obtain graphitic carbon nitride (g-$C_3N_4$) doped mesoporous carbonized MOF denoted as [MOFCN550]. The synthesized MOFCN550 composite was carbonized at different temperature preferably 800° C., 900° C. and 1000° C. each in an Argon atmosphere for 2-5 hrs to obtain the composite MOFCN800, MOFCN900 and MOFCN1000 respectively.

The lower alcohol used in the process is selected from methanol, ethanol, propanol, preferably ethanol, and suitable mass ratio of MOF-5 and melamine is in the range of 1:2 to 1:5.

The process for the preparation of N-doped porous carbon electrocatalyst comprise the nanoporous carbonized MOF i.e. [MOFC] and melamine ground together in a mass ratio of 1:3 and dispersed in ethanol followed by sonication and stirring to get a homogeneous mixture. The resulting material was then subjected to solvent evaporation by simultaneous heating and stirring at temperature range 50° C.-100° C. till a solid material was obtained. The solid material was again heated in a flow of inert atmosphere (Argon) at 550° C. at a rate of 5° C./min for 3 h followed by natural cooling to RT.

In the next step, the as synthesized MOFCN550 composite was further subjected to pyrolysis at 800°, 900° and 1000° C. each and the samples were denoted as MOFCN800, MOFCN900 and MOFCN1000 respectively. The nanostructures catalyst selected from the group consisting of MOFCN550, MOFCN800, MOFCN900 and MOFCN1000 possess large number of ORR active sites along with better pore volume for facile and faster transport of gases and ions to the active sites. The catalyst substantially proves to be an effective ORR catalyst with a onset potential of 0.035V with current density of 4.2 mA/cm$^2$ with very good electrochemical stability, high CO tolerance than conventional Pt based catalysts. The instant electrocatalysts are a specific form of catalysts that function at electrode surfaces or may be the electrode surface itself in the fuel cell.

The invention provides the characterization of N-doped porous carbon catalyst by means of Powder XRD, Raman spectrometry, X-ray photoelectron spectroscopy, and other techniques such as SEM, TEM, cyclic voltammetry, rotating ring-disk electrode, Nitrogen adsorption-desorption and likewise.

Characterization of the Prepared Catalysts

The powder X-ray diffraction (PXRD) analyses of the catalysts were done using PAN alytical X'pert Pro instrument, with the scan rate of 0.5° per min, with the 2θ value ranging from 0 to 60,° using Cu Kα (1.5418 Å) radiation. The structure and morphology analysis were carried out using a high resolution transmission electron microscope (HR-TEM) FEI model TECNAI G$^2$ F30 instrument operated at an accelerating voltage of 300 kV (Cs=0.6 mm, resolution 1.47 Å). TEM samples were prepared by dispersing the prepared catalysts in isopropyl alcohol followed by drop casting the suspension onto a 200 mesh copper grid coated with carbon film (ICON Analytical) and drying under lamp overnight. Elemental analysis were done using a scanning electron microscope (SEM) system (FEI, Model Quanta 200 3D) equipped with EDX (Energy dispersive X-ray) analysis attachment at an operating potential of 30 kV. X-ray photoelectron spectroscopy (XPS) was done on a VG Microtech Multilab ESCA 3000 spectrometer that was equipped with an Mg Kα X-ray source (hv=1253.6 eV). Raman analysis of MOFC, MOFCN800, MOFCN900 and MOFCN1000 were performed on an HR 800 Raman spectrometer (Jobin Yvon, Horiba, France) using 632.8 nm green laser (NRS 1500 W) in order to obtain the graphitic, and defective nature of the carbon. Nitrogen adsorption-desorption experiments were conducted at 77 K using Quantachrome Quadrasorb automatic volumetric instrument using ultra-pure $N_2$ (99.9995%). For the gas adsorption measurements, the samples were pre-activated at room temperature (for 24 h) and 100° C. (for 36 h) under ultrahigh vacuum (10-8 mbar) for overnight. About 50 mg of the samples were loaded for gas adsorption, and the weight of each sample was recorded before and after degassing in order to confirm the complete removal of all guest molecules in MOFC and MOFCN550. Thermo gravimetric analyses were carried out by a Perkin Elmer STA 6000 analyzer from room temperature to 900° C. with a temperature ramp of 10° C. min$^{-1}$.

Figure 1:
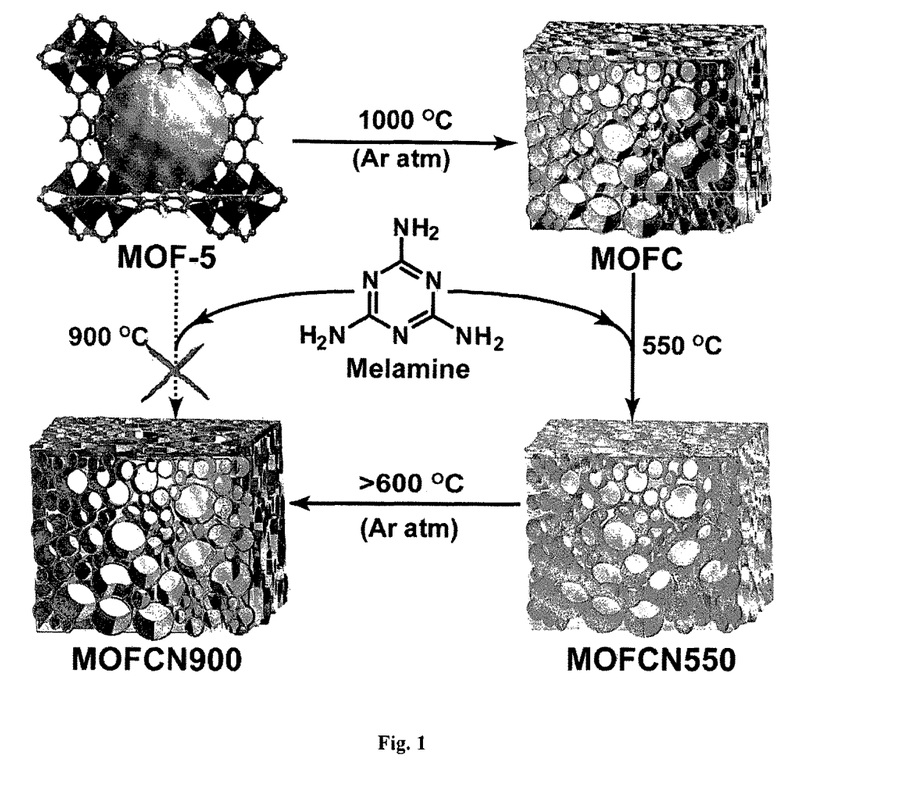
FIG. 1 depicts construction of N-doped porous carbon formed $g-C_3N_4$ on melamine impregnation into the pores of carbonized MOF-5 followed by carbonization at higher temperature (>600° C.).
Figure 2:
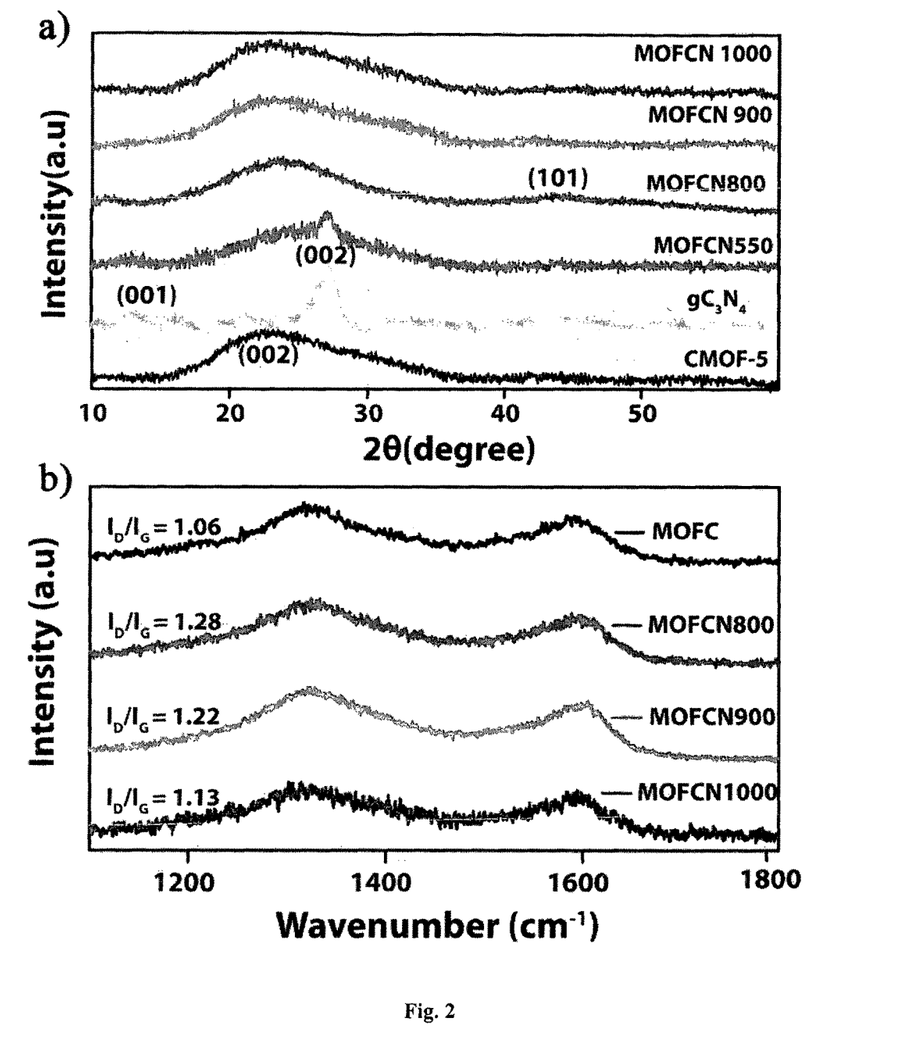
FIG. 2 depicts a) The PXRD pattern obtained for CMOF-5, $g-C_3N_4$, and the samples heated at different temperatures (MOFCN550, MOFCN800, MOFCN900 and MOFCN1000), b) Comparison of Raman spectra for the samples MOFCN800, MOFCN900, and MOFCN1000.

Accordingly the PXRD pattern of MOF-5 derived carbon (MOFC) exhibits peaks at ~25 and ~44° corresponding to the diffractions from the (002) and (100) graphitic carbon planes respectively which suggest the presence of long range ordering in the carbon matrix (FIG. 2a). The absence of ZnO peaks confirms the purity of the resulting nanoporous carbons. In case of g-$C_3N_4$, a strong diffraction peak at 27.31° corresponding to the interlayer stacking of the aromatic melamine units has been observed. The PXRD of MOFCN550 consists of the peaks corresponding to both g-$C_3N_4$ and MOFC which further confirms the polymerization of melamine and in situ formation of g-$C_3N_4$ at 550° C. The samples heated at elevated temperatures, show only one peak at 26.2°, which indicates the decomposition of g-$C_3N_4$. The shift in the peak position indicates the possible intercalation of N atoms inside the carbon matrix, thereby introducing nitrogen doping in the carbon matrix.

Figure 3:
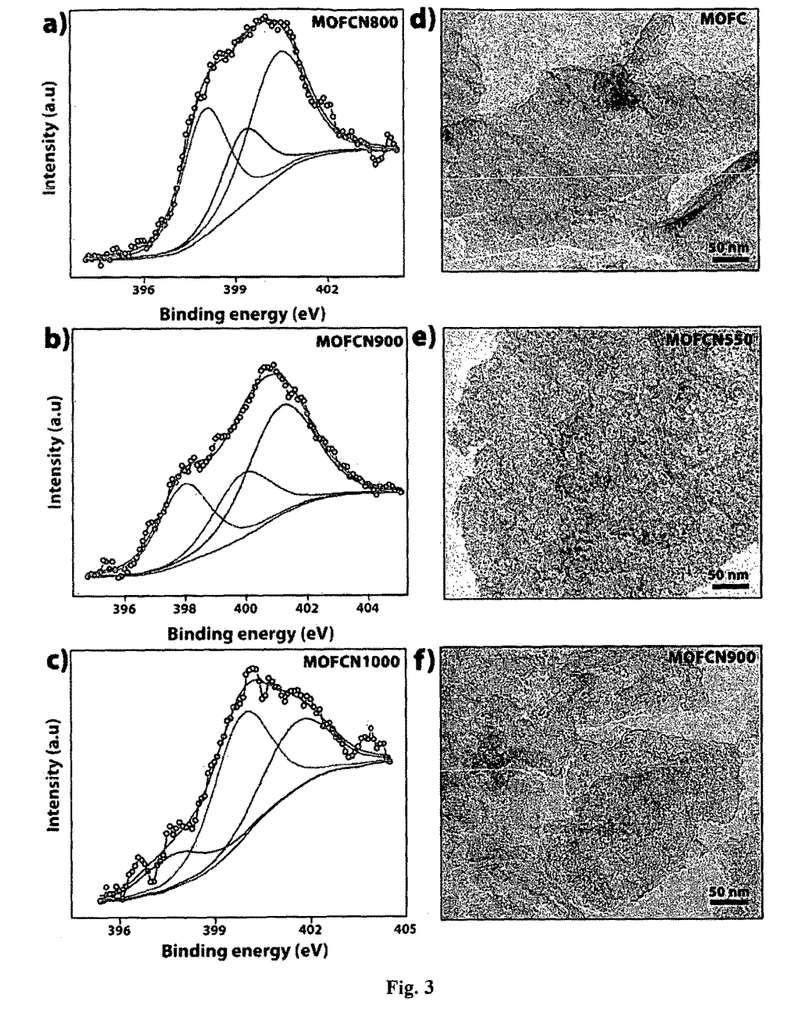
FIG. 3 depicts XPS spectra of carbons; a) MOFCN800, b) MOFCN900, and c) MOFCN1000; images (d-f) correspond to the TEM images of MOFC, MOFCN550 and MOFCN900 respectively.
Figure 9:
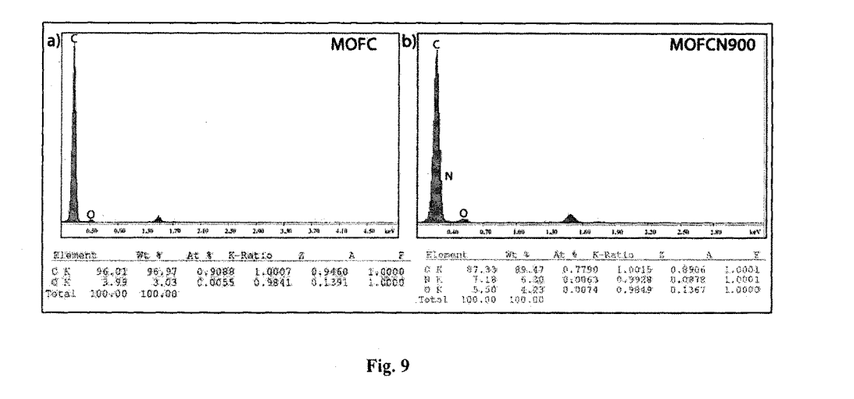
FIG. 9 depicts EDX spectra and the elemental composition of the MOFC (a). The peak profile clearly shows the presence of C, O elements, without any traces of metal impurities. On nitrogen doping, i.e., in case of MOFCN900 (b), the profile shows the addition of N element to the carbon matrix. It is important to note that the N content of 7.18% observed through EDX analysis is in good agreement with the XPS results.

All the samples exhibit similar Raman spectra with the corresponding D band at 1327 cm$^{-1}$, indicative of the disordered graphite (diamond) structure and G band at 1595 cm$^{-1}$ indicating the presence of crystalline graphitic carbon (FIG. 2b). In comparison, of all the carbons, MOFCN800 shows higher $I_D/I_G$ ratio of 1.28, due to the highest N content. The XPS spectra along with the EDX analysis (FIG. 9) reveal a decrease in the total N content with increase in the pyrolysis temperature. Of all, MOFCN800 shows highest N content (8.26%) followed by MOFCN900 (7.0%) and MOFCN1000 (4.26%). Further, on observing the type of N present, it could be speculated that with increase in temperature from 800 to 900° C., conversion of pyridinic-N into graphitic-N was being favored (FIG. 3). Thus, from Raman and XPS, it could be understood that the decrease in the ID/IG ratio and N content in case of MOFCN900 and MOFCN1000 could be a result of less extent of doping with rise in temperature.

Figure 6:
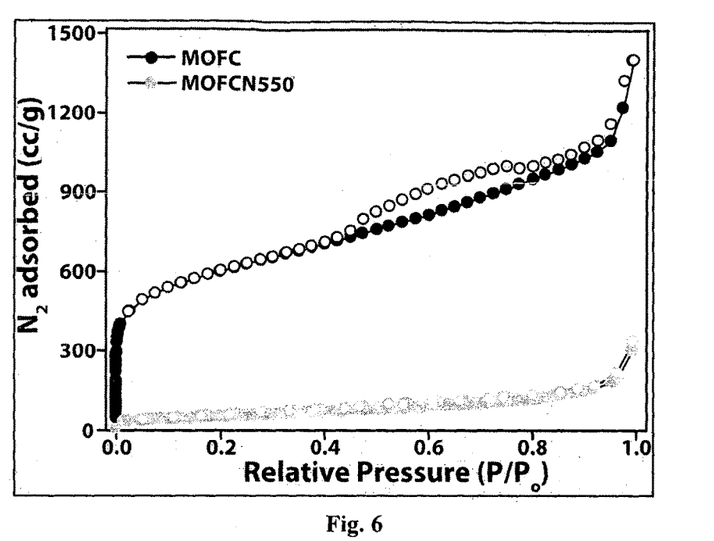
FIG. 6 depicts MOFC shows a BET (Brunauer Emmett and Teller) surface area of 2184 $m^2/g$. In case of MOFCN550 composite, on $g-C_3N_4$ incorporation, the surface area is found to decrease dramatically to 276 $m^2/g$. This suggests the possible plugging of the carbon pores with $g-C_3N_4$.
Figure 7:
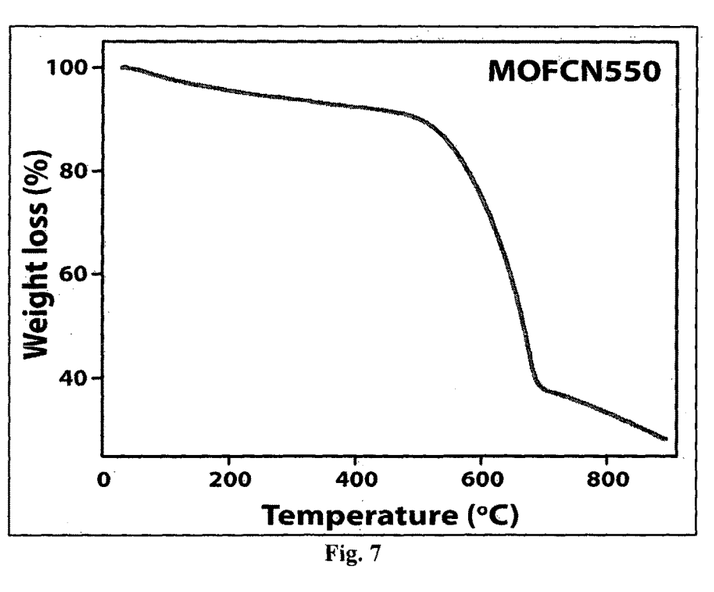
FIG. 7 depicts thermo gravimetric analysis of the MOFCN550 was performed by heating the sample from RT to 900° C. in $N_2$ atmosphere. The initial weight loss is mainly due to the solvent molecules. This is followed by a major weight loss region from 600 to 900° C. which can be attributed to the decomposition of $g-C_3N_4$ which begins at around 550° C. Around 80% weight loss suggests the completion of decomposition of g-$C_3N_4$, leaving behind residual carbon.
Figure 8:
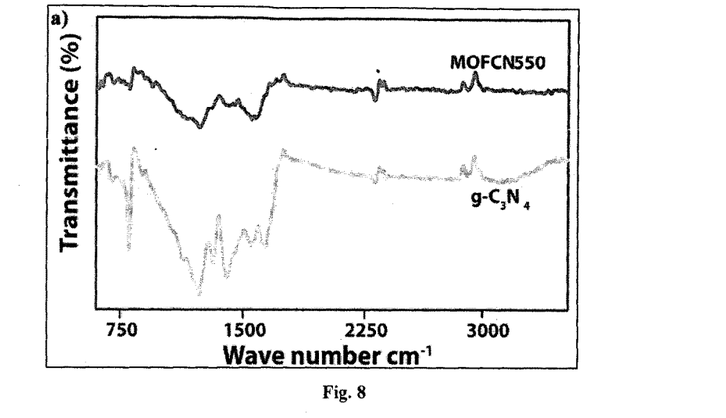
FIG. 8 depicts IR spectra of MOFCN550 and pristine g-$C_3N_4$. In case of g-$C_3N_4$, the band at 810 cm$^{-1}$ corresponds to the characteristic tri-s-triazine unit and the band ranging from 1250 to 1650 cm$^{-1}$ corresponds to the C—N bonds of g-$C_3N_4$ units. Similar feature could be observed in case of the composite material MOFCN550 which confirms the in situ formation of g-$C_3N_4$.

Further the TEM image of MOFC shows the presence of ordered pores in the carbon matrix (FIG. 3d). MOFCN550 indicates the presence of g-C3N4 particles with slate like structure of the carbon matrix (FIG. 3e). On the other hand, MOFCN900 shows the presence of microporous sheet very much similar to that MOFC which further indicates the transition of g-$C_3N_4$ into porous N doped carbon without any apparent evidence of the plugged g-$C_3N_4$ (FIG. 3f). The N2 sorption study of MOFC shows a BET (Brunauer Emmett and Teller) surface area of 2184 m$^2$/g exhibiting Type I isotherm (FIG. 6). On g-C3N4 incorporation, the surface area of the MOFCN550 composite decreases dramatically to 276 m$^2$/g which suggests the possible plugging of the carbon pores with g-C3N4. The TGA profile of MOFCN550 reveals a weight loss above 550° C. (FIG. 7) which indicates the decomposition of the plugged g-$C_3N_4$. The IR spectrum of the composite prepared at 550° C. reveals the presence of g-$C_3N_4$ (bands at 810 and 1050-1600 cm-1 corresponding to C=N stretching and tri-s-triazine units respectively) inside the MOF derived carbon (FIG. 8).

Figure 10:
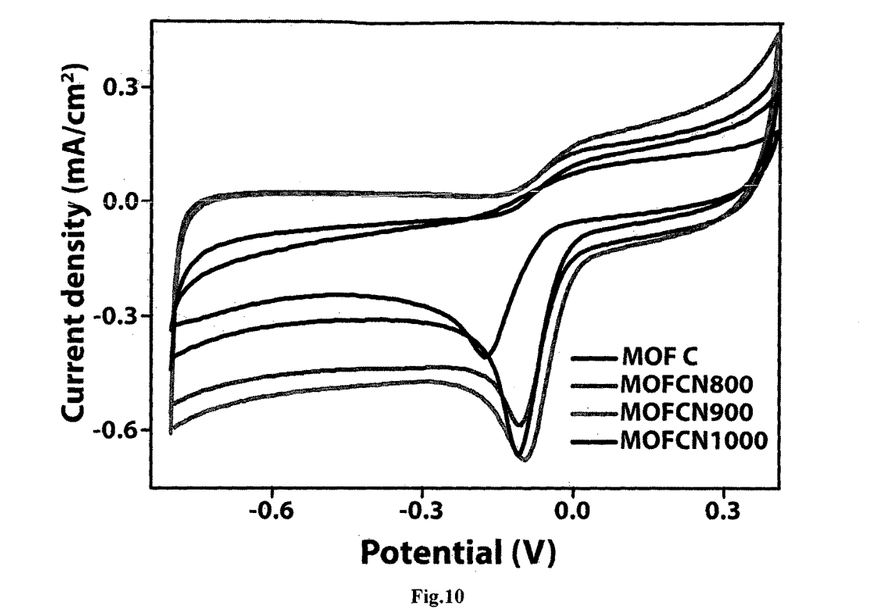
FIG. 10 depicts Cyclic voltammograms of the prepared electrocatalysts in 0.1 M KOH electrolyte, with a scan rate of 10 mV/s, Pt wire as the counter electrode and Hg/HgO as the reference electrode were during the analysis.

Cyclic voltammetry (CV) measurements were performed using a three-electrode system with 0.1 M KOH solution as electrolyte, Hg/HgO as reference and Pt wire as counter electrodes. The as such MOF derived carbon shows poor ORR activity. On functionalization, a remarkable favored shift in the onset potential could be observed. Of all the composites prepared, MOFCN900 shows the highest electrochemical performance wherein the reduction current starts increasing as the system gets saturated with O2, leading to a well-defined cathodic peak at −0.09 V (FIG. 4a and ESI, FIG. 10). However, on further rise in the calcination temperature, a decrease in the catalytic performance is also observed. This ascertains the reduction in the number of active sites with decrease in the N content in the system. The linear sweep voltammogram (LSV) of MOFCN800 shows an onset potential at 0.0 V and a current density of 3.74 mA/cm$^2$, which are comparatively higher than that of the as such MOF derived carbon. On increasing the temperature to 900° C. (as in case of MOFCN900), the onset potential is found to have shifted towards 0.035 V along with an improved current density of 4.08 mA/cm$^2$, although the N content decreased to about 7%. It therefore fares well in comparison to that of PtC40 with just 65 mV over potential against that of the commercial one (FIG. 4b).

Figure 4:
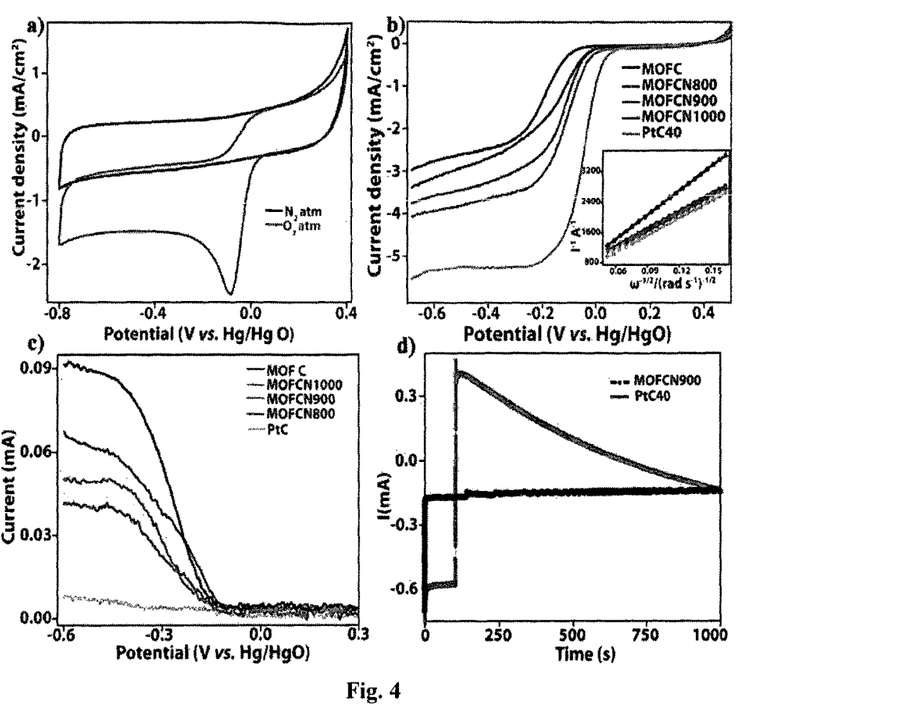
FIG. 4 depicts CV curves of MOFCN900 under $N_2$ and $O_2$ saturated conditions in 0.1M KOH at a scan rate of 10 mV/s. b) Combined steady state polarization analysis of the catalysts under study (inset: K-L plots derived from the polarization studies of the prepared samples. c) RRDE plots of the samples. d) Chrono amperometric responses on $CH_3OH$ addition at 150 s.
Figure 5:
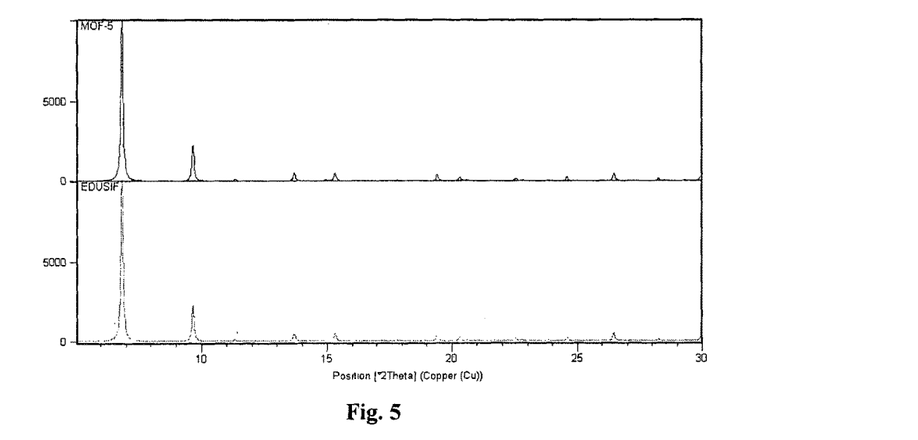
FIG. 5 depicts PXRD patterns of MOF-5.

The reaction kinetics of all the samples was further studied by rotating ring disc electrode (RRDE) technique (FIG. 4c) wherein the number of e$^-$ transferred per $O_2$ molecule was determined using the Koutecky-Levich (K-L) plot (inset FIG. 4b). Of all, MOFCN900 showed an e-transfer number of 3.12 (cf table 1), with a perokide yield of only 22% at −0.2 V, indicating a greater contribution from the desired 4e-pathway (FIG. 4c) which provides a favourable shift in the ORR kinetics on nitrogen doping. Thus, as evident from its influence on the electrochemical performance of the current materials of interest, as well from the previous literature, it could be ascertained that graphitic-N forms the major active site for ORR.

TABLE 1

Summary of the yield of $H_2O_2$ formed during RRDE analysis and electron transfer number calculated from K-L plots, of electrocatalysts under study:

| Sample | $H_2O_2$ yield (%) | No. of e$^-$ transferred |
|---|---|---|
| MOFC | 56 | 2.20 |
| MOFCN800 | 26 | 3.06 |
| MOFCN900 | 22 | 3.12 |
| MOFCN1000 | 32 | 3.09 |

Figure 11:
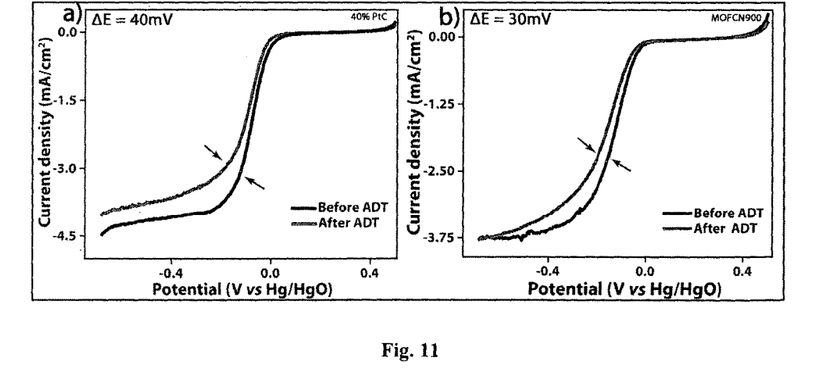
FIG. 11 depicts Linear sweep voltammograms of (a) PtC40 and (b) MOFFCN900 before and after ADT in 0.1 M oxygen saturated KOH at a rotation speed of 1600 rpm and a scan rate of 10 mV/S. Pt wire as the counter electrode and Hg/HgO as the reference electrode were used in the study.

From these results, it can be observed that the amount of N and right combination of the types of N (graphitic and pyridinic) play a crucial role in ORR. The accelerated durability test (ADT) was conducted by cycling the potential between −0.25 to 0.25 V for 1000 cycles. From the LSV plots, it clearly shows that PtC40 suffers a negative potential shift of 40 mV vs. Hg/HgO, whereas, the observed potential degradation for the in-house metal-free catalyst is only 30 mV (FIG. 11). It therefore reveals the superior electrochemical stability of the instant catalyst.

Further, the chronoamperometric study proves that unlike the Pt catalyst, MOFCN900 does not show a change in current upon addition of $CH_3OH$ (FIG. 4d). It thus substantiates the higher tolerance of the instant catalyst towards fuel crossover and CO poisoning.

Electrochemical Studies of the Prepared Catalysts

All electrochemical experiments were done by using an Autolab PGSTAT 30 (Ecochemie) with conventional three-electrode system received from Pine Instruments. Hg/HgO (1M KOH) and Pt wire were used as reference and counter electrodes respectively. The working electrode used was a glassy carbon (GC) electrode (5 mm diameter) embedded in Teflon. This electrode was polished on a polishing cloth using 0.3 µm alumina slurry followed by washing with water and acetone. The sample coating on the working electrode was carried out as follows: 5 mg of catalyst was dispersed in 1 ml of ethanol in water (3:2) solution by sonication. 10 µl aliquot of the prepared slurry was drop-casted on the GC electrode with the help of a micro syringe. Subsequently, 3 µl of 0.1% Nafion® solution in ethanol was coated on the surface as a binder. This electrode was further dried in air for 3 h and was used as the working electrode. 0.1 M KOH was used as the electrolyte for all the electrochemical studies. RRDE experiments were carried out in a Biologic VPM3 instrument using Pt ring working electrode. All the CV and RDE experiments were carried out at a scan rate of 10 mV/s. $O_2$ and $N_2$ were used to achieve oxygen saturated and oxygen-free environments respectively for the RDE experiments.

The number of electrons transferred per oxygen molecule in the ORR process is determined using Koutecky-Levich (K-L) equation and measuring the yield of $H_2O_2$ formation using RRDE analysis. The K-L equation relates the inverse of the current density (j$^{-1}$) and the inverse of the square root of the rotation speed ($\omega^{-1/2}$), and can be represented as follows, $$\frac{1}{j_{lim}} = \frac{1}{j_k} + \frac{1}{B\omega^{0.5}}$$

$$B = 0.62nFC_0(D_0)^{2/3}v^{-1/6}C_{O2;}$$

where, $j_k$ is the kinetic current density, $\omega$ is the angular velocity and B is related to the diffusion limiting current density, also expressed in the above equation. Where, F is the Faraday constant (F=96485 C mol$^{-1}$), $C_{O2}$ is the bulk concentration of $O_2$ (1.2×10$^{-3}$ mol l$^{-1}$), v is the kinematic viscosity of the electrolyte (v=0.1 m$^2$ s$^{-1}$), and D is the diffusion coefficient of $O_2$ in 0.1 M KOH (1.9×10$^{-5}$ cm$^2$ s$^{-1}$). K-L plots, which deals with the limiting current density (j) and square root of rotation speed ($\omega^{1/2}$), are presented in FIG. 4b. It shows a linear relation between the current density and square root of the rotation speed in the potential range of −0.25 to −0.6 V.

The yield of $H_2O_2$ formed during RRDE analysis was calculated from the following formula, $$\% \text{ of } H_2O_2 = \frac{\left(200 * \frac{I_r}{N}\right)}{\left(I_d + \left(\frac{I_r}{N}\right)\right)}$$

where I$_r$=ring current, I$_d$=disc current, and N=collection efficiency.

Consequently, the invention provides efficient electrocatalyst i.e. g-C3N4 doped porous carbon using MOF as a carbon template which is obtained by simple pyrolysis of melamine with MOF derived mesoporous carbon [MOFC] thereby enriching the nitrogen content to 7.0-8.3% besides maintaining high surface area.

Further, MOFCN900 shows enhanced ORR activity comparable to that of the commercial Pt catalyst. This can be attributed to the synergetic effect between the highly ordered mesoporous carbon, which improves the mass transfer along with improved diffusion of electrolyte towards the active sites, and g-C$_3$N$_4$ intermediate which helps in the generation of the desired N-doped active sites (graphitic and pyridinic in this case). In addition to the enhanced ORR activity, the catalyst is found to possess high fuel selectivity and superior durability. This route thereby opens a new pathway for the design and development of metal-free electrodes as fuel, cell cathodes. Such N-doped carbon composites have enormous potential applications in various renewable energy fields viz. fuel cells, solar cells, supercapacitors and so on.

EXAMPLES

The following examples are given by way of illustration and therefore should not be construed to limit the scope of the invention.

Materials and Methods

Melamine, potassium hydroxide (KOH), zinc nitrate hexahydrate, terephthalic acid and diethylformamide (DEF) were procured from M/s. Aldrich Chemicals. Isopropyl alcohol (IPA) and ethanol were obtained from Rankem Chemicals. All the chemicals were used as received without any further purification. A poly (tetrafluoroethylene) (PTFE) filter paper (pore size, 0.45 µm; Rankem) was used for the filtration. A copper grid with a carbon support (Icon Analytical Inc.) was used for the HRTEM observations.

Example 1: Synthesis of MOF-5

The synthesis of MOF-5 was carried out as per the standard procedure reported in the art. In brief, a mixture of zinc nitrate hexahydrate (0.4 g) and terephthalic acid (0.1 g) in 10 ml diethylformamide (DEF) was sonicated for 10 min and heated at 90° C. for 3 days. The crystals obtained were later filtered and dried at 60° C.

Example 2: Synthesis of MOFCN Catalysts

Mesoporous carbon was obtained by the pyrolysis of MOF-5. In a typical procedure followed, the MOF-5 crystals were transferred into an alumina boat and carbonized at 1000° C. at a heating rate of 5° C./min in Ar atmosphere for 3 h. The final product was collected, washed in DI water and dried overnight at 60° C. The obtained end carbon was observed to resemble the structure of the original MOF crystals thereby proving the template nature of the MOF. This carbon was further used for the incorporation of melamine, which was taken as the nitrogen source. The nanoporous carbon samples derived from MOF-5 and melamine were ground together in a mass ratio of 1:3 by using mortar and pestle to get a uniform mixture. The mixture was then dispersed in ethanol followed by sonication for 30 min in a bath type sonicator followed by stirring for 12 h at room temperature (27° C.) in order to get a homogeneous mixture. The resulting material was then subjected to solvent evaporation by simultaneous heating and stirring at 60° C. till a solid material was obtained. The solid material was again heated in a flow of Ar atmosphere at 550° C. at a rate of 5° C./min for 3 h followed by natural cooling to RT. This final product, denoted as MOFCN550, was used for the future studies. In the next step, the as synthesized MOFCN550 composite was further subjected to pyrolysis at 800, 900 and 1000° C. each and the samples were denoted as MOFCN800, MOFCN900 and MOFCN1000 respectively.

Advantages of the Invention

Metal free material as oxygen reduction reaction catalyst, thereby obviates the problems such as metal corrosion, electrochemical stability associated with metal.

Simple method of preparation.

Retains porosity as well as conductivity when compared to source of Carbon.

Higher electrochemical stability and no fuel cross-over effect.

N doping occurs uniformly through the structure of the Carbon matrix with nitrogen content of 7.0% to 8.3%.

Better onset potential shown by the catalyst (0.035V) w.r.t Hg/HgO.

We claim:

1. A process for the preparation of an N-doped porous carbon electrocatalysts comprising carbon in the range of 90 to 93% and nitrogen in the range of 7 to 10%:
   a. pyrolysing of metal organic frameworks (MOF) to obtain mesoporous carbon (MOFC);
   b. mixing and grinding the mesoporous carbon as obtained in step (a) and melamine to get a uniform mixture;
   c. dispersing the uniform mixture of step (b) in alcohol in order to get a homogeneous mixture;
   d. evaporating solvent by simultaneous heating and stirring the homogeneous mixture as obtained in step (c) till a solid material obtained;
   e. heating the solid material as obtained in step (d) in a flow of argon atmosphere to obtain a composite;
   f. pyrolysing the composite as obtained in step (e) under argon atmosphere to obtain N-doped porous carbon electrocatalyst;
   wherein in step (b) the ratio of the mesoporous carbon and melamine ranges between 1:2 to 1:5.

2. The process as claimed in claim 1, wherein the MOF is selected from the group consisting of MOF-2, MOF-5.

3. The process as claimed in claim 1, wherein in step (a) pyrolysis is done at temperature in the range of 900 to 1000° C. at a heating rate of 3 to 5° C./min for period in the range of 2 to 3 h.

4. The process as claimed in claim 1, wherein in step (c) alcohol is selected from methanol, ethanol, propanol.

5. The process as claimed in claim 1, wherein in step (c) the dispersion is sonicated for period in the range of 20 to 30 min in a bath type sonicator followed by stirring for period in the range of 6 to 12 h at room temperature in the range of 25 to 30° C.

6. The process as claimed in claim 1, wherein in step (d) evaporation is performed at temperature in the range of 50 to 60° C.

7. The process as claimed in claim 1, wherein in step (e) heating is performed at temperature in the range of 300 to 550° C. and flow of argon at a rate of 3 to 5° C./min for period in the range of 2 to 3 h followed by natural cooling to room temperature in the range of 25 to 30° C.

8. The process as claimed in claim 1, wherein in step (f) pyrolysing at a rate of 3 to 5° C./min for period in the range of 2 to 3 h.

9. The process as claimed in claim 1, wherein in step (f) heating is carried out at 700-1000° C.

* * * * *